July 7, 1925.

H. GOODER 1,544,834

AUTOMATICALLY VARIABLE SPEED GEARING

Filed June 12, 1924

Inventor:
Harry Gooder
By his Attorney: Walter Gunn

Patented July 7, 1925.

1,544,834

UNITED STATES PATENT OFFICE.

HARRY GOODER, OF MORECAMBE, ENGLAND.

AUTOMATICALLY-VARIABLE SPEED GEARING.

Application filed June 12, 1924. Serial No. 719,657.

*To all whom it may concern:*

Be it known that I, HARRY GOODER, a subject of the King of Great Britain and Ireland, residing at Morecambe, England, have invented new and useful Improvements in and Relating to Automatically-Variable Speed Gearing, of which the following is a specification.

This invention relates to automatically variable speed gearing.

The object of this invention is to provide a gear for the transmission of power which will automatically vary the ratio of rotation between the power and the load members with the variation of either the power or load torques.

An automatically variable speed gear made in accordance with this invention comprises a differential train of gearing having power, load, and reaction members capable of relative rotation and a gyroscopic wheel coupled to the reaction member of the gearing to govern by resistance applied as torque the relative motion or rotation between the power and load members.

Referring to the drawings filed herewith:—

Figure 1:
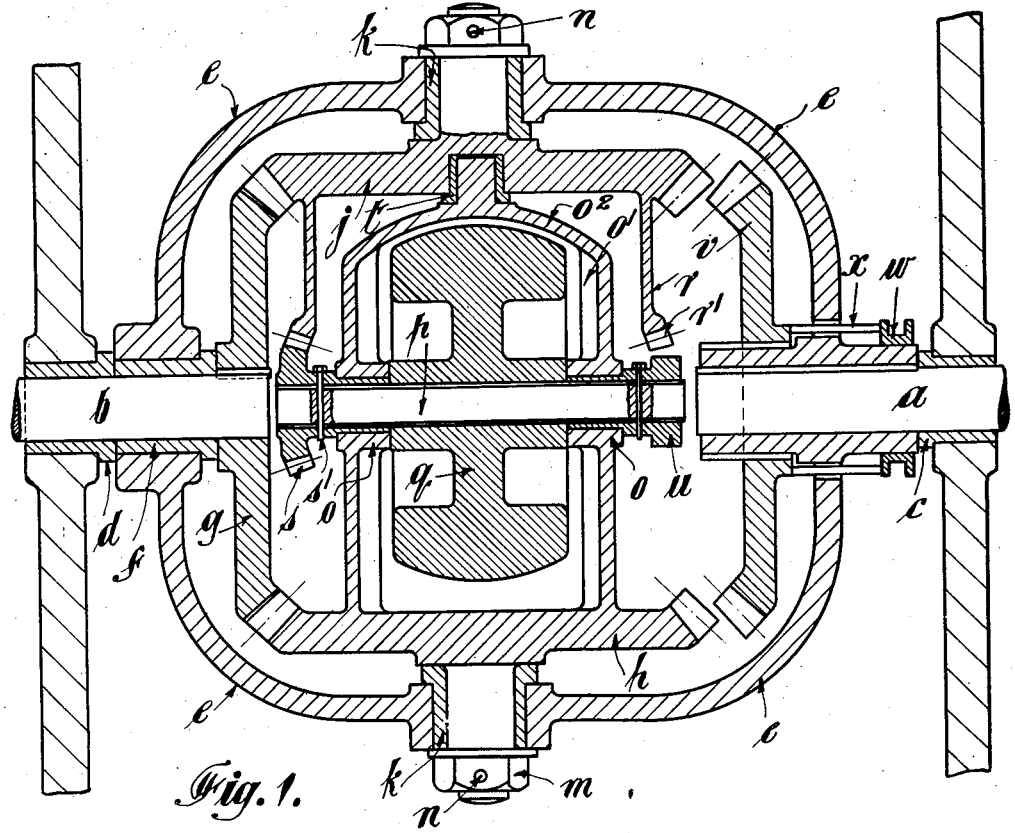
Fig. 1 is a sectional elevation of one form of variable gear made in accordance with this invention.
Figure 2:
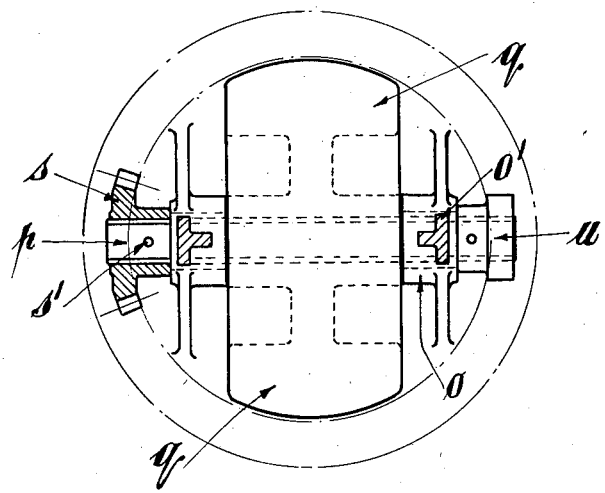
Fig. 2 is a detail plan of the gyroscope.

In the form shown in the drawings, $a$ is the driving or power shaft and $b$ the driven or load shaft supported by bearings $c$ and $d$ respectively and about which the whole gear rotates. It will be understood that the gear will work equally well with $b$ as the power shaft and $a$ as the load shaft.

Mounted on the shaft $a$ and keyed thereto is a cage member $e$ which is journaled at $f$ on the shaft $b$. A bevel wheel $g$ is keyed on to the inner end of the shaft $b$ and the cage $e$ carries cross bevels $h$ and $j$, mounted in bearings $k$ and meshing with the bevel $g$. The cross bevels are secured against axial movement by nuts and washers $m$, the nuts being secured by pins $n$. The cross bevel $h$ is formed with brackets having lugs $o$, $o$ in which is journaled the splined shaft $p$ carrying the gyroscopic wheel $q$, the axis of the cross bevel $h$ lying in the central plane of the gyroscopic wheel $q$. The cross bevel $j$ is formed with a concentric cylindrical extension $r$, the end of which is cut to form a bevel $r^1$ which engages with a bevel $s$ secured by a pin $s^1$ on one end of the splined shaft $p$. The lugs $o$, $o$ are formed with extensions $o^1$ connected by bridge $o^2$, this latter being journaled in a bearing $t$ in the cross bevel $j$ to provide additional support against the forces of the gyroscope. A balance weight $u$ to balance the bevel $s$ is disposed on the end of the shaft $p$. The drawing shows plain bushed bearings but obviously ball or roller bearings could be used where desired. A locking bevel $v$ is slidably mounted on splines on the end of the shaft $a$ and within the cage $e$ and adapted to engage with the bevels $h$ and $j$ and so lock the members of the differential against relative rotation when a direct drive is required. An operating ring $w$ is mounted externally of the cage $e$ and connected by rods $x$ to the bevel $v$.

In operation, when there is relative motion between the driving and driven shafts, the cross bevels are caused to rotate about their axis in opposite directions whereby the gyroscopic wheel $q$ is caused to rotate on its axis and create resistance to the rotation of its gimbles or bearings $o$, formed on the cross bevel $h$ and in the cage $e$ in the manner peculiar to gyroscopes. The gear may be used in conjunction with a clutch or reverse or other ratio gearing if desired, and such other clutch or gearing may be disposed of in the same casing. The gyroscopic wheel may be driven at a speed either proportional to the speed of rotation of the driving or driven member, or to the relative speed of the said members, or to both so as to vary its resisting effort as torque in proportion thereto.

The principle of this gear is based on the properties of a gyroscope, its resistance to change of position, and its powers of precession being applied in the form of a torque or twisting effort between the driving and driven members as here described or with the driving and driven shafts interchanged, and is greater or less according as the gyro's speed of rotation is increased or decreased as its plane of rotation is being changed at a proportionately higher or lower rate.

From a standstill, when driving shaft $a$ commences to rotate and with it, casing $e$ and pinions $h$ and $j$, these also commence rotating additionally, in opposite directions about their own axis, due to wheel $q$ being momentarily held by the load against which it has to do work and which is at this position a stationary rack. Pinions $h$ and $j$ rotating in opposite directions the ratio of wheel $r^1$ to pinion $s$ will be doubled, consequently rotating the gyro $q$ through shaft $p$ at a greatly increased speed. Now, during this period the axis and plane of rotation of the gyro is continually changing at the speed of rotation of pinion $h$ about its axis, and also about axis of the shafts $a$ and $b$ due to being carried round by casing $e$. To this change of position at the speed at which it is rotating when shaft $b$ is stationary and shaft $a$ is quickly rotating, it offers considerable resistance, in the form of gyroscopic torque on the teeth of pinion $h$ and as this is applied to the working faces of the teeth of this pinion, this force increases as the speed of shaft $a$ increases and $b$ remains stationary until it overcomes the resistance transferred to wheel $g$ by the loaded shaft $b$. This effort to overcome the resistance of wheel $g$ is also added to, to some degree, by the inertia reaction through pinion $s$, wheels $r^1$ and $j$ to the working face of wheel $g$, when gyro $q$ is being urged against its reluctance to change position.

Conjointly, though principally by virtue of the gyroscopic torque, this effort increases as the speed of shaft $a$ increases until the resistance due to loading on shaft $b$ is overcome and wheel $g$ then commences to rotate and as this speed increases so the relative speeds of pinion $h$ and $j$ decreases in proportion, and with them the torque values to conform to the demand of shaft $b$ on the driving shaft $a$ until pinions $h$ and $j$ finally become stationary about their own axis, but are turning about the common axis of the shafts $a$, $b$ at the speed of rotation of shaft $a$ taking up position shown Fig. 1. At this stage the gyro $q$ possesses a value due to the common speed of shafts $a$ and $b$, corresponding to a top gear drive, this position the gyro refusing to change from, except when increased loading tends to retard shaft $b$ and wheel $g$, the gyro then adjusting itself to deal with this increase when it again commences to rotate and change position, the above functioning taking place until for a heavy load pinions $h$ and $j$ move at their maximum ratio to each other giving the fullest value of gyro torque to the loaded wheel $g$ corresponding to the lowest gear ratio.

When a direct drive is required the members of the differential gear may be locked against relative rotation by sliding the bevel $v$ into engagement with the bevels $h$ and $j$.

What I claim is:—

1. An automatically variable speed gear comprising a differential gear having power, load and reaction members capable of relative rotation, at least one gyroscopic wheel mounted for rotation on a complementary axis at right angles to the axis of the gyroscopic wheel, means operably connecting the gyroscopic wheel to the reaction member to turn it on that complementary axis with the said relative rotation thereof, and means for rotating the gyroscopic wheel, the axis of the differential gear lying in the plane of rotation of the axis of the gyroscopic wheel.

2. An automatically variable speed gear comprising a differential gear, having power, load, and reaction members capable of relative rotation, at least one gyroscopic wheel mounted for rotation on a reaction member, with its axis at right angles to the axis thereof, the axis of the differential gear lying in the plane of rotation of the axis of the gyroscopic wheel, and means for rotating the gyroscopic wheel.

3. An automatically variable speed gear comprising a differential gear having power, load and reaction members capable of relative rotation, a reaction member having its axis at right angles to and intersecting the axis of rotation of the differential gear, a gyroscopic wheel mounted for rotation on the reaction member, the axis of the reaction member lying in the central plane of the gyroscopic wheel and the axis of the differential gear lying in the plane of rotation of the axis of the gyroscopic wheel, and means for rotating the gyroscopic wheel.

4. An automatically variable speed gear comprising a differential gear having power, load and reaction members capable of relative rotation, at least one gyroscopic wheel mounted for rotation on a complementary axis at right angles to the axis of the gyroscopic wheel, the axis of the differential gear lying in the plane of rotation of the axis of the gyroscopic wheel, means operably connecting the gyroscopic wheel to the reaction member to turn it on that complementary axis with the said relative rotation thereof, and means connected to the gyroscopic wheel to cause it to rotate with its rotation on its complementary axis.

5. An automatically variable speed gear comprising a differential gear having power, load and reaction members capable of relative rotation, a reaction member having its axis at right angles to and intersecting the axis of rotation of the differential gear, a gyroscopic wheel mounted for rotation on the reaction member, the axis of the reaction member lying in the central plane of the gyroscopic wheel and the axis of the differential gear lying in the plane of rotation of the axis of the gyroscopic wheel, a second reaction member opposed to the first reaction member and a drive for the gyroscopic wheel therefrom.

6. An automatically variable speed gear having power, load and reaction members and comprising a bevel gear wheel forming one member, two coaxial and opposite epicyclic bevel gears engaging therewith forming two reaction members, a cage carrying the two reaction members and forming the other member, a gyroscopic wheel mounted on one reaction member with the axis of that reaction member lying in the central plane of the gyroscopic wheel and with the axis of the power and load members lying in the plane of rotation of the axis of the gyroscopic wheel, a bevel on the shaft of the gyroscopic wheel and a bevel on the other reaction member engaging therewith, as set forth.

7. An automatically variable speed gear having power, load and reaction members and comprising a bevel gear wheel forming one member, two coaxial and opposite epicyclic bevel gears engaging therewith forming two reaction members, a cage carrying the two reaction members and forming the other member, a gyroscopic wheel mounted on one reaction member with the axis of that reaction member lying in the central plane of the gyroscopic wheel and with the axis of the power and load members lying in the plane of rotation of the axis of the gyroscopic wheel, a bevel on the shaft of the gyroscopic wheel, a bevel on the other reaction member engaging therewith and means for inter-locking the members against relative rotation, as set forth.

8. An automatically variable speed gear having power, load and reaction members and comprising a main bevel gear wheel forming one member, two coaxial and opposite epicyclic bevel gears engaging therewith forming two reaction members a cage carrying the two reaction members and forming the other member, a gyroscopic wheel mounted on one reaction member with the axis of that reaction member lying in the central plane of the gyroscopic wheel and with the axis of the power and load members lying in the plane of rotation of the axis of the gyroscopic wheel, a bevel on the shaft of the gyroscopic wheel, a bevel on the other reaction member engaging therewith and a bevel slidably mounted on the cage opposite to the main bevel to engage with the epicyclic reaction bevels and lock the members against relative rotation, as set forth.

In testimony whereof I have signed my name to this specification.

HARRY GOODER.